(12) United States Patent
Abro et al.

(10) Patent No.: US 12,344,130 B2
(45) Date of Patent: Jul. 1, 2025

(54) ADJUSTABLE VEHICLE SEAT ATTACHMENT SYSTEM

(71) Applicant: Toyota Motor Engineering & Manufacturing North America, Inc., Plano, TX (US)

(72) Inventors: Lauren M. Abro, West Bloomfield, MI (US); Yuko N. Gidcumb, West Bloomfield, MI (US); Michelle R. Vargo, Plymouth, MI (US); Lindsay A. Babian, Canton, MI (US); Hamshivraj Singh Dhamrat, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 261 days.

(21) Appl. No.: 17/730,568

(22) Filed: Apr. 27, 2022

(65) Prior Publication Data
US 2023/0347792 A1   Nov. 2, 2023

(51) Int. Cl.
*B60N 2/26* (2006.01)
*B60N 2/01* (2006.01)
*B60N 2/04* (2006.01)
*B60R 22/24* (2006.01)

(52) U.S. Cl.
CPC ............ *B60N 2/012* (2013.01); *B60N 2/04* (2013.01); *B60N 2/26* (2013.01); *B60R 22/24* (2013.01)

(58) Field of Classification Search
CPC ...... B60N 2/012; B60N 2/01508; B60N 2/04; B60N 2/26; B60N 2/28; B60N 2/283; B60R 22/24

USPC ....................... 296/65.02; 410/104
See application file for complete search history.

(56) References Cited

U.S. PATENT DOCUMENTS

| | | | | |
|---|---|---|---|---|
| 2,605,064 A | * | 7/1952 | Davis | B64D 9/00 410/104 |
| 2,625,118 A | * | 1/1953 | Lechner | B64D 9/00 193/41 |
| 4,180,283 A | | 12/1979 | Ziv | |
| 4,183,580 A | * | 1/1980 | Johansson | B60N 2/2824 D6/333 |

(Continued)

FOREIGN PATENT DOCUMENTS

| | | | | |
|---|---|---|---|---|
| AU | 2022200286 B1 | * | 1/2023 | ........... B60N 2/2821 |
| CA | 3039371 A1 | * | 10/2019 | ............. A47D 13/08 |

(Continued)

OTHER PUBLICATIONS

Definition of 'along' from google search (Year: 2024).*
Definition of 'on' from google search (Year: 2024).*

*Primary Examiner* — Hilary L Gutman
(74) *Attorney, Agent, or Firm* — Snell & Wilmer LLP

(57) ABSTRACT

An adjustable vehicle seat attachment system is provided. Rather than having child seats placed in fixed adult seats of a vehicle, child seats may be connected directly to the vehicle. Moreover, the anchors that the child seats connect to may be moved around an interior space of the vehicle so that the child seat may be placed in different locations throughout the vehicle interior. The child seats may be anchored to different spots along a floor of a vehicle. The child seats maybe anchored to different spots along an interior ceiling of a vehicle.

11 Claims, 6 Drawing Sheets

(56) References Cited

U.S. PATENT DOCUMENTS

| | | | |
|---|---|---|---|
| 4,475,746 A | 10/1984 | Akiyama | |
| 5,118,163 A * | 6/1992 | Brittian | B64D 11/0612 297/254 |
| 5,169,091 A * | 12/1992 | Beroth | B64D 9/003 244/118.6 |
| 5,224,756 A | 7/1993 | Dukatz et al. | |
| 5,409,293 A * | 4/1995 | Nagasaka | B60N 2/3086 297/236 |
| 5,823,724 A * | 10/1998 | Lee | B60P 7/0815 410/112 |
| 6,120,093 A * | 9/2000 | Gyllenspetz | B60N 2/26 297/250.1 |
| 6,260,813 B1 * | 7/2001 | Whitcomb | B64D 11/0696 244/118.6 |
| 6,572,171 B1 | 6/2003 | Pautz et al. | |
| 6,585,465 B1 * | 7/2003 | Hammond | B60R 7/02 410/104 |
| 6,779,900 B1 | 8/2004 | Nolan-Brown | |
| 7,185,919 B2 | 3/2007 | Mather et al. | |
| 7,229,117 B2 * | 6/2007 | Okuda | B60N 2/3011 296/65.09 |
| 7,296,840 B2 | 11/2007 | Martone et al. | |
| 7,350,853 B2 * | 4/2008 | Fitze | B62D 29/005 410/104 |
| 7,364,199 B2 | 4/2008 | Elizondo et al. | |
| 7,410,127 B1 * | 8/2008 | Ahad | B64C 1/20 244/118.6 |
| 7,510,227 B2 | 3/2009 | Mahaffy | |
| 7,665,939 B1 * | 2/2010 | Cardona | B60P 7/0815 410/11 |
| 8,376,306 B2 * | 2/2013 | Dowty | B60N 2/01575 410/104 |
| 8,702,169 B2 * | 4/2014 | Abadilla | B60N 2/2869 297/256.16 |
| 9,676,304 B2 | 6/2017 | del Puerto Camargo et al. | |
| 10,730,413 B1 * | 8/2020 | Riad | B60N 2/0806 |
| 2010/0202850 A1 * | 8/2010 | Parsons | B61D 45/001 410/104 |
| 2011/0043014 A1 * | 2/2011 | Templaman | B60N 2/3081 297/255 |
| 2012/0292962 A1 * | 11/2012 | Takakura | B60N 2/0818 297/232 |
| 2014/0271021 A1 * | 9/2014 | Cardona | B60N 2/01558 410/104 |
| 2017/0057380 A1 * | 3/2017 | Vikstrom | B60N 2/0705 |
| 2018/0361890 A1 * | 12/2018 | Ishizaka | B60N 2/2887 |
| 2020/0171983 A1 * | 6/2020 | Dry | B60N 2/06 |
| 2021/0101507 A1 * | 4/2021 | Ohno | B60N 2/28 |
| 2023/0391229 A1 * | 12/2023 | Gruener | B60N 2/34 |

FOREIGN PATENT DOCUMENTS

| | | | | |
|---|---|---|---|---|
| CN | 102371917 A | * | 3/2012 | ........... B60N 2/2821 |
| CN | 108349551 B | * | 11/2020 | ............. B60N 2/015 |
| DE | 19901784 A1 | * | 8/1999 | ........... B60R 22/023 |
| DE | 19949933 C1 | * | 2/2001 | ............... B60N 2/06 |
| DE | 10036551 A1 | * | 9/2001 | ......... B60N 2/01558 |
| DE | 10036553 A1 | * | 9/2001 | ......... B60N 2/01558 |
| EP | 1630032 A1 | * | 3/2006 | ............. B60N 2/206 |
| FR | 2777236 A1 | * | 10/1999 | ......... B60N 2/01516 |
| JP | 5952106 B2 | * | 7/2016 | |
| KR | 20090055968 A | | 6/2009 | |
| WO | WO-9729922 A1 | * | 8/1997 | ............... B60N 2/26 |
| WO | WO-2009086579 A1 | * | 7/2009 | ............. B60N 2/206 |

\* cited by examiner

ADJUSTABLE VEHICLE SEAT ATTACHMENT SYSTEM

BACKGROUND

Field

This disclosure relates to a vehicle seat attachment system for vehicles and more specifically, to an adjustable vehicle seat attachment system.

Description of the Related Art

Frequently drivers place child safety seats in adult vehicle seats to safely transport children in vehicles. Presently, adult vehicle seats are generally fixed in a fixed location within a vehicle. This limits flexible positioning of child safety seats in vehicles. However, adult vehicle seats are positioned to accommodate adult size bodies. As such, the positioning of child safety seats in vehicles is frequently inconvenient or difficult to access. In addition, drivers may desire to reconfigure a vehicle cabin interior arrangement depending on the number of passengers of different ages and sizes being transported. Finally, inconvenient positioning of child safety seats in vehicles may present safety hazards, particularly in connection with managing attention of the driver and access of the driver to the child to promote child safety as well as driver focus on driving tasks to promote driving safety. Thus, there is a need for a system, apparatus, and method to facilitate easy and ready repositioning of child safety seats at locations throughout the vehicle.

SUMMARY

An adjustable vehicle seat attachment system is provided. The system may include an anchor frame and a first movable anchor. The anchor frame may include a first frame member attachable to a vehicle by body anchors. The first movable anchor may be movably attached to the first frame member and configured to selectably connect to and disconnect from a first anchor clip of a seat. In various embodiments, the first movable anchor moves along a length of the first frame member to reposition the seat at different locations inside the vehicle.

The adjustable vehicle seat attachment system may have other aspects as well. Among the other aspects, the system may include a second movable anchor movably attachable to at least one of the first frame member and/or a second frame member of the anchor frame and configured to selectably connect to and disconnect from a second anchor clip of the seat. The second movable anchor moves along at least one of the length of the first frame member and/or a length of the second frame member to reposition the seat at the different locations inside the vehicle. The system may include a third movable anchor movably attachable to at least one of the first frame member and/or the second frame member and/or a third frame member of the anchor frame and configured to selectably connect to and disconnect from a third anchor clip of the seat. The third movable anchor moves along at least one of the length of the first frame member and/or the length of the second frame member and/or a length of the third frame member to reposition the seat at the different locations inside the vehicle.

The adjustable vehicle seat attachment may have, in various embodiments, the first frame member including a track having a channel into which a portion of the first movable anchor is inserted and slidable. A second movable anchor may be provided. The second movable anchor may be movably attachable to the first frame member of the anchor frame and configured to selectably connect to and disconnect from a second anchor clip of the seat. A portion of the second movable anchor is inserted and slidable in the channel of the track of the first frame member.

A second movable anchor may be movably attachable to a second frame member of the anchor frame and may be configured to selectably connect to and disconnect from a second anchor clip of the seat. The second frame member may include a track having a channel into which a portion of the second movable anchor is inserted and slidable. The seat may be a child seat. The seat may be an adult vehicle seat. The first frame member of the anchor frame may be permanently attached to the vehicle with body anchors. In some embodiments, the first frame member of the anchor frame is permanently attached to the vehicle with body anchors and the second frame member of the anchor frame is permanently attached to the vehicle with body anchors.

A vehicle is provided. The vehicle may have an adjustable vehicle seat attachment system. The system may include an anchor frame and a first movable anchor. The anchor frame may include a first frame member and a second frame member attached to the vehicle along an interior surface of the vehicle. The anchor frame may include a third frame member attached to the vehicle along an interior surface of the vehicle. A first movable anchor may be movably attached to the first frame member, and a second movable anchor may be movably attached to the second frame member. A third movable anchor may be movably attached to the first frame member, the second frame member, and/or a third frame member. In various embodiments, the first movable anchor moves along a length of the first frame member and the second movable anchor moves along the length of the first frame member or a length of the second frame member to reposition a seat at different locations inside the vehicle. In various embodiments, the third movable anchor moves along a length of the third frame member to reposition the seat at different locations inside the vehicle.

The vehicle may include one or more additional aspect. For instance, the interior surface of the vehicle may be an interior roof surface. The interior surface of the vehicle may be an interior floor surface. The first frame member may be on an interior roof surface of the vehicle and the second frame member may be on an interior floor surface of the vehicle. The first frame member and the second frame member may be attached to the vehicle by body anchors extending through the interior surface of the vehicle. The first frame member and the second frame member may be attached to the vehicle by body anchors extending through a structural component of the vehicle such as a center console or other suitable anchoring surface. The first frame member may include a track having a channel that retains a portion of the first movable anchor slidably therein. The seat may be a child seat that is connected to the anchor frame by the first and second movable anchors and is not positioned in an adult vehicle seat of the vehicle. In other instances, the seat is an adult vehicle seat. In further instances, the seat may be a seat or bed of any vehicle or mobility device such as a wheelchair, an ambulance bed, a pet carrier, configurable tie downs for customer mobility vehicles, configurable tie downs for cargo applications, and the like.

An adjustable vehicle seat attachment system is disclosed. The system may include an anchor frame, a first movable anchor, a second movable anchor, and a seat. The anchor frame may have a first frame member attached to a vehicle by one or more body anchors and a second frame member attached to the vehicle by one or more body anchors. The first movable anchor may be movably attached to the first frame member and slidable along a length of the first frame member by sliding in a channel of the first frame member. The second movable anchor may be movably attached to the second frame member and slidable along a length of the second frame member by sliding in a channel of the second frame member. The first movable anchor may connect to a first anchor clip of a seat. The second movable anchor may connect to a second anchor clip of the seat. The first frame member and the second frame member may be parallel so that the first movable anchor and the second movable anchor move together to reposition the seat at different locations along the parallel first and second frame members. The seat may be a child safety seat connected to the anchor frame by the first and second movable anchors and not positioned in an adult vehicle seat of the vehicle.

The adjustable vehicle seat attachment system may have other aspects as well. For instance, the first movable anchor may be removable from the channel of the first frame member and the second movable anchor may be removable from the channel of the second frame member to remove the seat from the vehicle. The first frame member may extend along an interior floor of the vehicle and the second frame member may extend along the interior floor of the vehicle.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure.

DETAILED DESCRIPTION

Disclosed herein is a system and apparatus for adjustably attaching a vehicle seat to a vehicle. Frequently, vehicle operators desire to include both adult seats and child seats in vehicles. Child safety seats are presently limited to being placed in an adult seat. However, safety and convenience is improved if child safety seats are positioned at different places throughout a vehicle cabin, depending on the number, size, and age of passengers. Moreover, there is a need for placement of child safety seats at convenient and safe locations irrespective of the positioning constraints associated with adult seats.

As such, an adjustable vehicle seat attachment system is provided herein. An anchor frame may include frame members that attach to a vehicle. Various movable anchors movably attach to the frame members and can connect to and/or disconnect from corresponding clips on the seats. The seats may be child seats with clips that attach to the movable anchors and disconnect from the movable anchors. The movable anchors may move along the frame members, such as being repositionable along a length of a frame member. By moving the movable anchors to desired locations in the vehicle and attaching the seat to the movable anchors, seats may be secured in the vehicle at different locations and without being limited to mere placement in a pre-existing or fixed adult seat.

Figure 1:
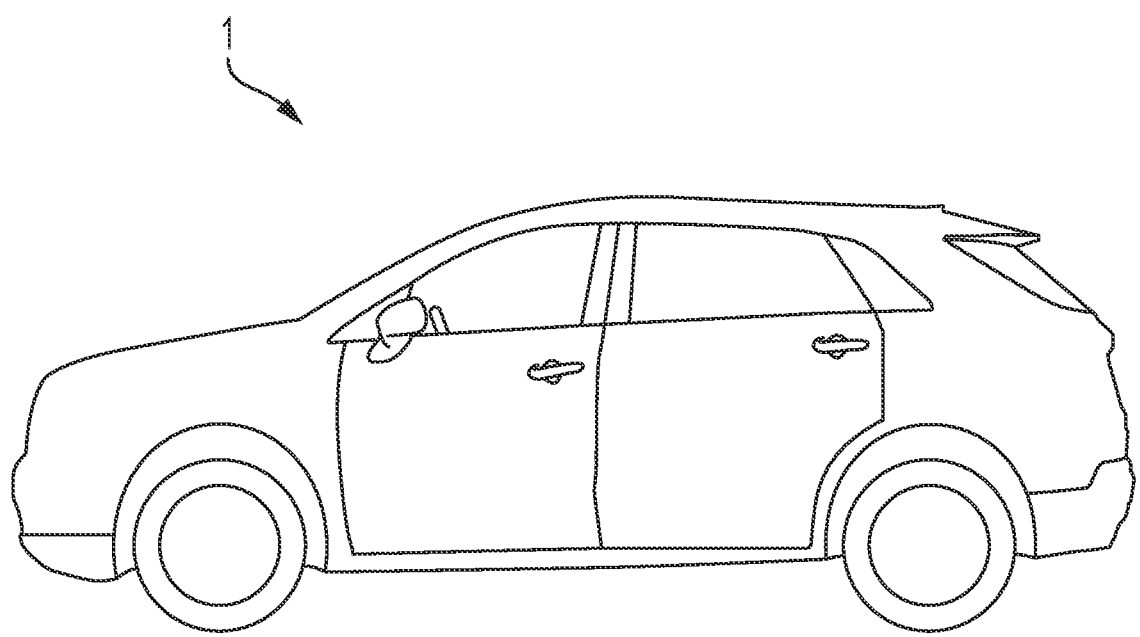
FIG. 1 illustrates a vehicle with seats, in accordance with various embodiments.
Figure 2A:
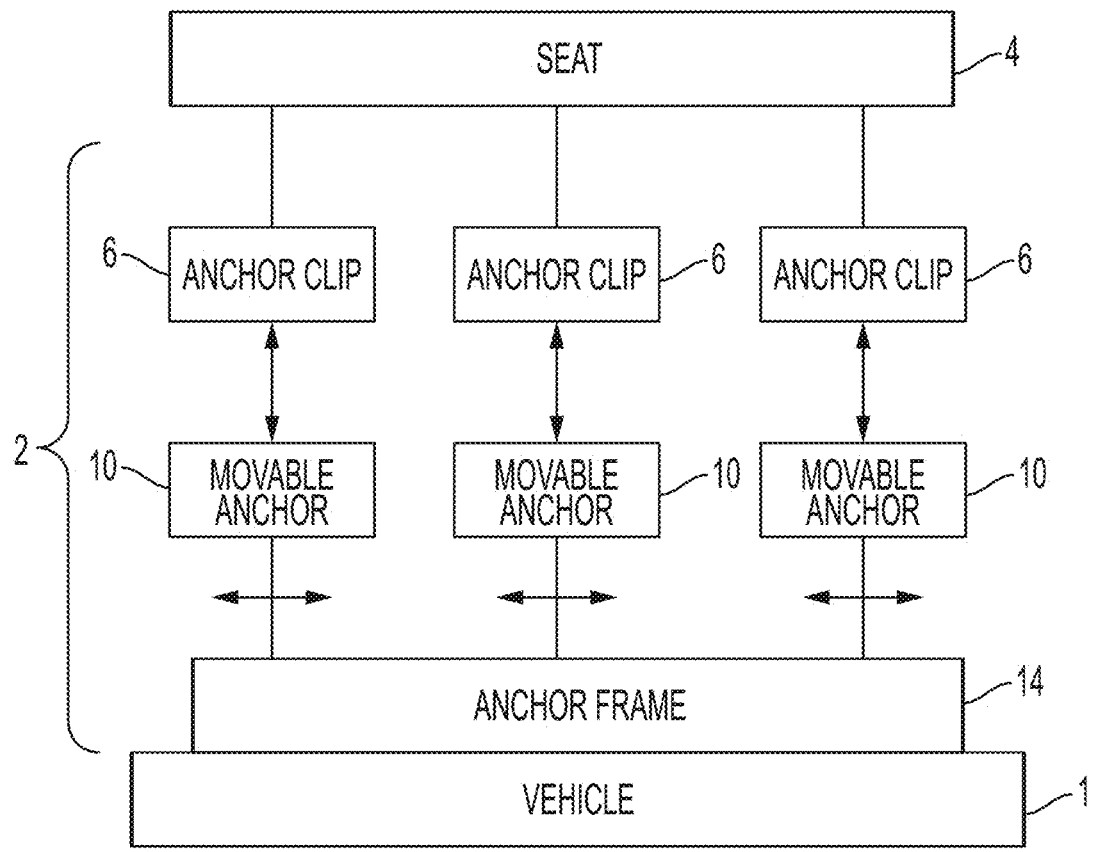
FIG. 2A illustrates a block diagram of an example adjustable vehicle seat attachment system, in accordance with various embodiments.

With reference now to FIGS. 1 and 2A, a vehicle 1 may include seats 4 for passengers. The vehicle 1 is illustrated as an automobile, though any type of vehicle may be contemplated. For instance, the vehicle may be an automobile, a truck, a bus, an aircraft, a space craft, a ship, a submersible vehicle, a self-propelled vehicle, a towed or pushed vehicle, a hand propelled vehicle such as a cart, and/or the like. These seats 4 may be inside the vehicle 1 to protect the occupants of the seats. The seat 4 may be a child safety seat. For instance, the seat 4 may include an infant seat. The seat 4 may include a booster seat for an older child. The seat 4 may include selectably installable adult seats as well. The seat 4 may be a seat or a bed of a vehicle (including mobility devices). For instance, the seat 4 may be a wheelchair, an ambulance bed, a pet carrier, configurable tie down systems for customer mobility vehicles, configurable tie down systems for cargo applications, and the like.

The adjustable vehicle seat attachment system 2 may be implemented to attach the seat 4 to the vehicle 1. The adjustable vehicle seat attachment system 2 may have various components. For instance, the adjustable vehicle seat attachment system 2 may have one or more anchor clips 6. The one or more anchor clips 6 may be a selectably engageable attachment clip that is connected to the seat 4. The one or more anchor clips 6 may be operated to attach to a movable anchor 10 or release from the movable anchor 10. In this manner, the anchor clip 6 may be clipped to the movable anchor 10 or unclipped from the movable anchor 10. In various embodiments, the anchor clip 6 includes a metal hook that moves in response to pressing a spring-loaded button. The metal hook may engage on a metal rod, an aperture, or other aspect of the movable anchor 10 to retain the seat 4 in mechanical connection to the movable anchor 10. In various instances, the anchor clip 6 includes a conventional seat attachment clip on an off-the-shelf child safety seat.

FIG. 2A depicts a system having three anchor clips 6. However, any number of anchor clips may be implemented. For instance, a first anchor clip 6 may be associated with each seat 4, or a first anchor clip 6 and a second anchor clip 6, or a first anchor clip 6, a second anchor clip 6, and a third anchor clip 6, or any number of anchor clips as desired.

The adjustable vehicle seat attachment system 2 may include a movable anchor 10. The movable anchor 10 may be a plate with an aperture to receive the anchor clip 6. The movable anchor 10 may be a rod arranged for the anchor clip 6 to clip onto the rod or may be any other mechanism configured to be attached to by the anchor clip 6. FIG. 2A depicts a system having three movable anchors 10. However, any number of movable anchors 10 may be implemented. For instance, a first movable anchor 10 may be associated with each seat 4, or a first movable anchor 10 and a second movable anchor 10, or a first movable anchor 10, a second movable anchor 10, and a third movable anchor 10, or any number of movable anchors 10 as desired.

The adjustable vehicle seat attachment system 2 may include an anchor frame 14. The anchor frame 14 may be a structure attached to the vehicle 1 and also attached to the movable anchors 10 in such a way as to permit the movable anchors 10 to move along the anchor frame 14 to different positions, while still remaining connected to the anchor frame 14. In this manner, the movable anchors 10 may be moved to locations throughout the vehicle 1, and the anchor clips 6 and movable anchors 10 are connected together to secure the associated seat 4 at different locations throughout the vehicle 1. In various instances, the anchor frame 14 is installed on an interior surface of the vehicle 1. In various instances, the anchor frame 14 is installed inside a vehicle interior but is connected to vehicle structures outside the vehicle interior, for increased mechanical integrity.

Figure 3:
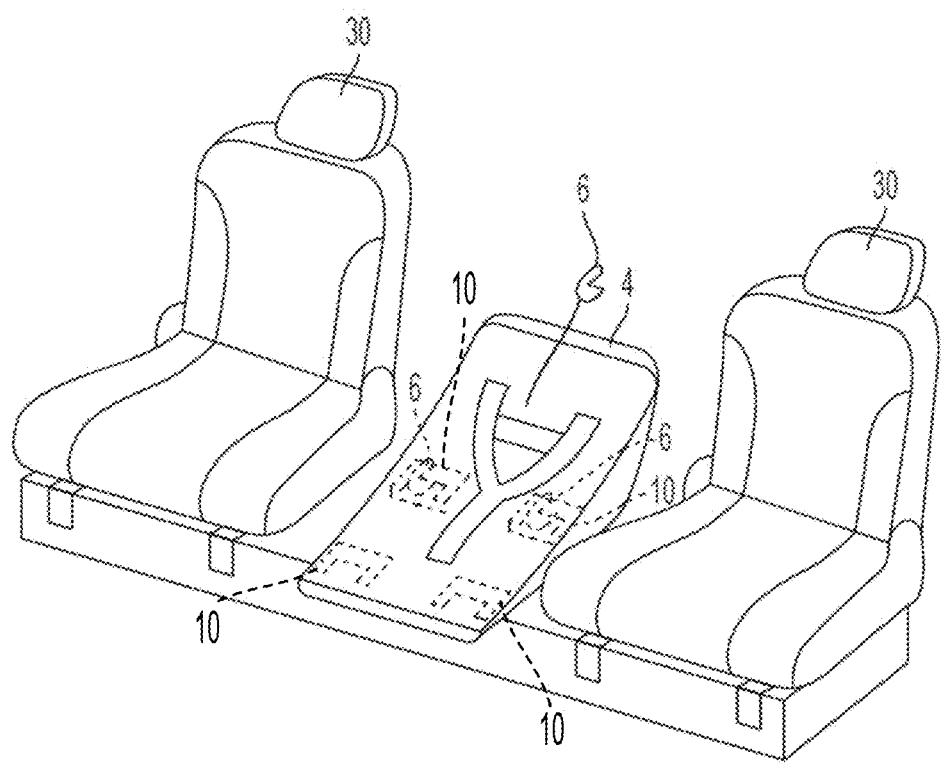
FIG. 3 illustrates an example seat installed in a vehicle by movable anchors and anchor clips, in accordance with various embodiments.

Turning to FIG. 3, with ongoing reference to FIG. 2A, an example implementation of aspects of the adjustable vehicle seat attachment system 2 is depicted having a seat 4 that is a child seat installed between two fixed vehicle seats 30. Notably, the child seat is not sitting in a fixed vehicle seat 30 but is installed in a space between the fixed vehicle seats 30. For instance, anchor clips 6 associated with the seat 4 connect to movable anchors 10 that have been moved to a position between the fixed vehicle seats 30. In this manner, vehicle space may be utilized more efficiently, and child seats may be placed in locations convenient for access by adults in fixed vehicle seats 30 who may desire to assist or comfort a child in the seat 4. In the example of FIG. 3, three anchor clips 6 are implemented. A first anchor clip 6 and a second anchor clip 6 attach the seat 4 to the vehicle 1 in a space between the fixed vehicle seats 30 and a third anchor clip 6 provides a tether anchor to limit twisting of the seat 4 about an axis provided by the first and second anchor clips 6.

Figure 2B:
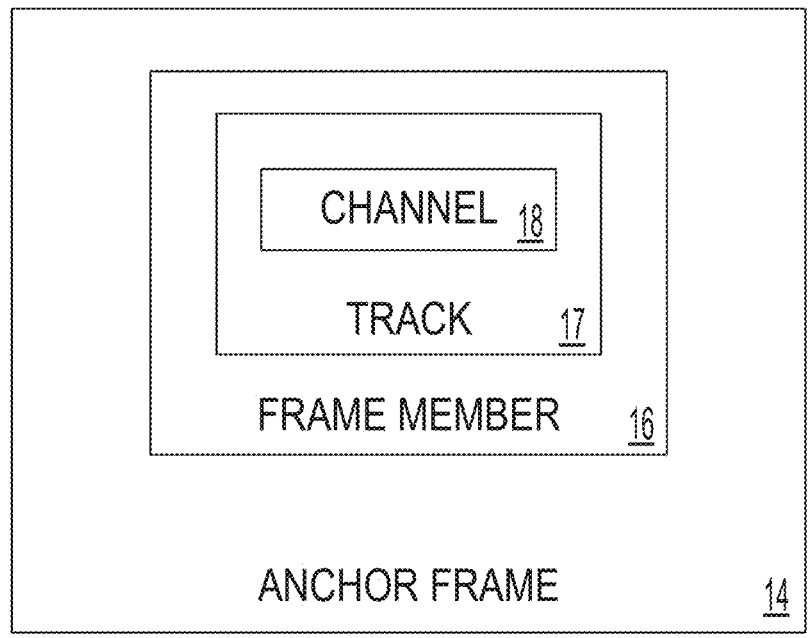
FIG. 2B illustrates a block diagram of a portion of an example adjustable vehicle seat attachment system, in accordance with various embodiments.
Figure 4:
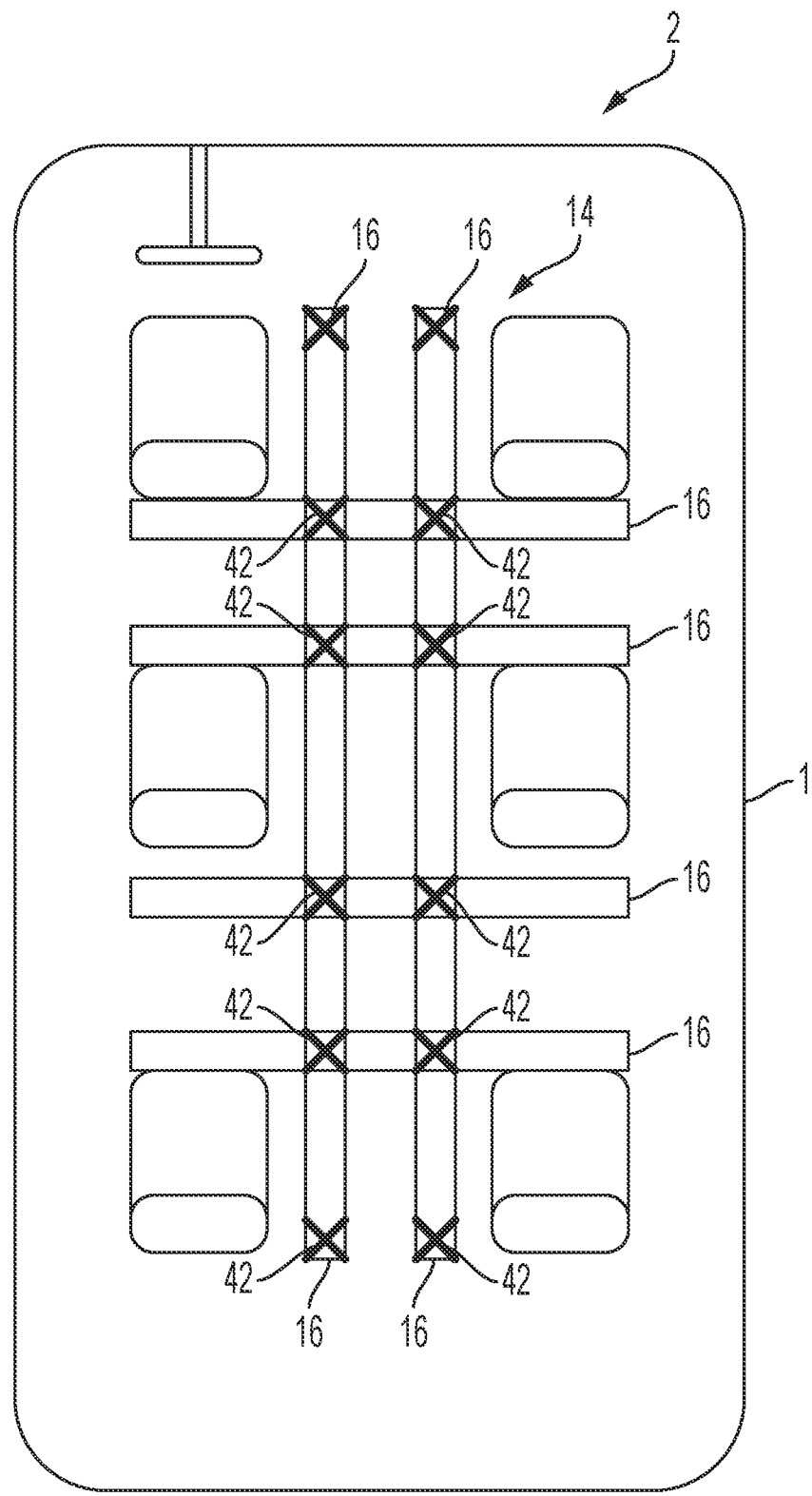
FIG. 4 illustrates an overhead view of a vehicle having an anchor frame with multiple frame members for slidably connecting to movable anchors, in accordance with various embodiments.

Turning to FIG. 4, also referencing FIGS. 2B and 3, an overhead view of an example vehicle 1 having an adjustable vehicle seat attachment system 2 is shown. In various instances, the adjustable vehicle seat attachment system 2 includes an anchor frame 14 that includes frame members 16. The frame members 16 may include a track 17 (also may be referred to as elongate bars) having a channel 18 therein. The channel 18 may be configured to receive a portion of a movable anchor 10 (FIG. 2A) so that the movable anchor 10 is retained in mechanical connection to the frame member 16. In this manner, the frame member 16 may hold a seat 4 attached to a movable anchor 10 by an anchor clip 6 in a desired position and safely retain the seat 4 in position in the vehicle 1 and may also permit the seat 4 to be relocated about a vehicle cabin by moving of the movable anchors 10 along the channel 18 of the frame member 16. In various instances, the frame member 16 and/or the movable anchor 10 may be made selectably fixed relative to one another so that movement of the movable anchor 10 is resisted. For instance, the track 17 may include detents, or the movable anchor 10 may include selectably extendable flanges, ridges, or other engagement structures configured to engage with the frame member 16. In various embodiments, the anchor frame 14 includes multiple frame members 16 disposed throughout the vehicle 1. For instance, parallel frame members 16 extend along a length of a vehicle 1 or along a width of a vehicle 1. In various instances, the frame members 16 are attached to the vehicle 1 by body anchors 42. A body anchor 42 may include an anchor that extends from an interior passenger compartment of a vehicle 1 to an exterior structural frame of a vehicle 1 so that items inside the interior passenger compartment may be securely fixed in a location relative to an exterior structural frame of a vehicle 1. In various embodiments, the body anchors 42 are disposed at ends or along a length of frame members 16 of the anchor frame 14 and connect the anchor frame 14 to an exterior structural frame of the vehicle 1.

Figure 5:
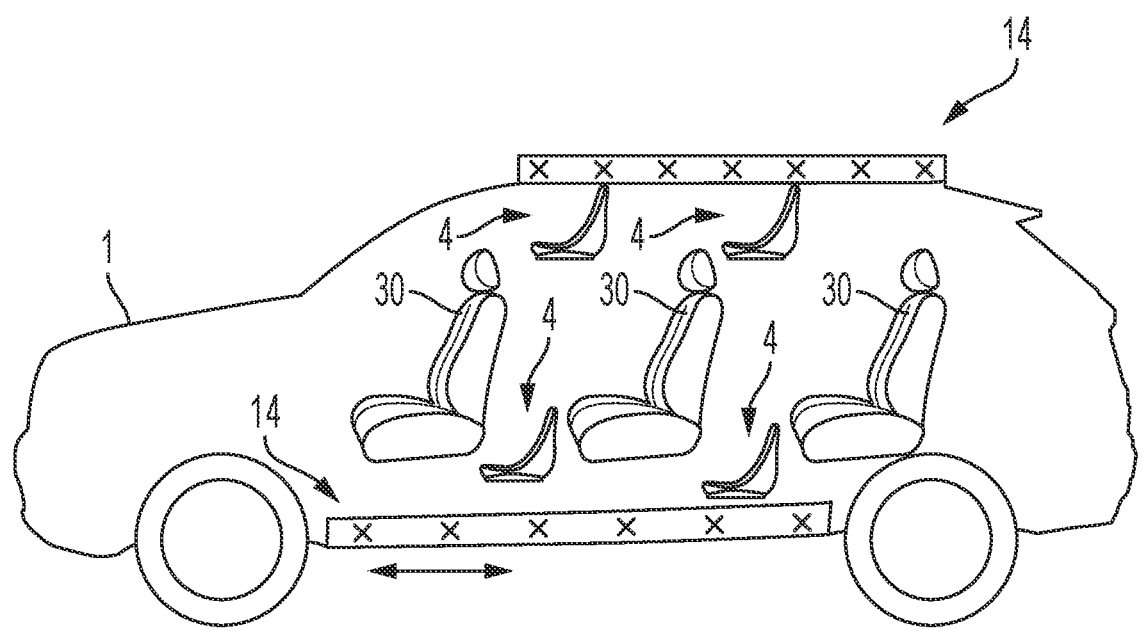
FIG. 5 illustrates example arrangements of seats in a vehicle with an adjustable vehicle seat attachment system, in accordance with various embodiments.

Referring now to FIG. 5, in various instances, the different aspects of the anchor frame 14 may be positioned on a vehicle floor, or a vehicle ceiling, or both a vehicle floor and ceiling, or other locations as desired. Aspects of the anchor frame 14 may be on a vehicle console, such as a center console between fixed vehicle seats, or elsewhere as desired. FIG. 5 illustrates various example placements of a seat 4 relative to fixed vehicle seats 30 and along anchor frames 14. For instance, seats 4 may be positioned along a side of fixed vehicle seats 30, or between fixed vehicle seats 30, or even along a vehicle ceiling rather than a more conventional placement of seats in connection with a vehicle floor.

Having explained various aspects of an example adjustable vehicle seat attachment system 2, attention now turns to a combination of FIGS. 1, 2A, 2B, and 3-5 and discussion of specific example embodiments of the adjustable vehicle seat attachment system 2. For instance, such an adjustable vehicle seat attachment system 2 may include an anchor frame 14 having a first frame member 16 that is attachable to a vehicle 1 by body anchors 42. A first movable anchor 10 is movable attached to the first frame member 16. The first movable anchor 10 is configured to selectably connect to and disconnect from a first anchor clip 6 of a seat 4. As such, the first movable anchor 10 moves along a length of the first frame member 16 of the anchor frame 14 to reposition the seat 4 at different locations inside the vehicle 1.

Furthermore, a second movable anchor 10 may also be implemented. The second movable anchor 10 may be attachable to at least one of the first frame member 16 and/or a second frame member 16 of the anchor frame 14 and may be configured to selectably connect to and disconnect from a second anchor clip 6 of a seat 4. The second movable anchor 10 moves along at least one of the length of the first frame member 16 and/or a length of the second frame member 16 to reposition the seat 4 at the different locations inside the vehicle 1.

The first frame member 16 may include a track 17 with a channel 18 into which a portion of the first movable anchor 10 is inserted and slidable along the track 17. Similarly, a portion of the second movable anchor 10 can be inserted and slidable in the channel 18 of the track 17 of the first frame member 16. However, different movable anchors 10 may be inserted and slidable in different channels 18 of different tracks 17 of different frame members 16. For instance, the second frame member 16 may have a track 17 with a channel 18 into which a portion of the second movable anchor 10 is inserted and slidable. The frame members 16 may be attached to the vehicle 1 permanently. For instance, the first frame member 16 may be attached to the vehicle 1 with body anchors 42. The second frame member 16 may also be permanently attached to the vehicle 1 with body anchors 42. Reference has been made to a seat 4. As discussed, the seat 4 may be a child seat. However, the seat 4 may be a booster seat. The seat 4 may be an adult vehicle seat as well.

In another example embodiment, a vehicle 1 is provided with an adjustable vehicle seat attachment system 2. The adjustable vehicle seat attachment system 2 may be an anchor frame 14 with a first frame member 16 and a second frame member 16 that are attached to the vehicle 1 along an interior surface of the vehicle 1. A first movable anchor 10 may be movably attached to the first frame member 16, and a second movable anchor 10 may be movably attached to the second frame member 16. The first movable anchor 10 moves along a length of the first frame member 16 and the second movable anchor 10 moves along the length of the first frame member 16 or a length of the second frame member 16 to reposition the seat 4 at different locations inside the vehicle 1. Notably, the interior surface of the vehicle 1 can be a variety of surfaces. For instance, the interior surface may be an interior roof surface. The interior surface may be an interior floor surface. The first frame member 16 may be on an interior roof surface of the vehicle 1 and the second frame member 16 may be on an interior floor surface of the vehicle 1. The first frame member 16 and the second frame member 16 may be attached to the vehicle 1 by body anchors 42 extending through the interior surface of the vehicle 1. The first frame member 16 may have a track 17 with a channel 18 that retains a portion of the first movable anchor 10 slidably therein. The seat 4 is a child safety seat connected to the anchor frame 14 by the first and second movable anchors 10 and is not positioned in an adult vehicle seat of the vehicle 1. In other instances, the seat 4 is an adult vehicle seat.

In yet another example embodiment, an adjustable vehicle seat attachment system 2 is provided with an anchor frame 14 that includes a first frame member 16 attached to a vehicle 1 by body anchors 42 and a second frame member 16 attached to the vehicle 1 by body anchors 42. The adjustable vehicle seat attachment system 2 includes a first movable anchor 10 movably attached to the first frame member 16 and slidable along a length of the first frame member 16 by sliding in a channel 18 of the first frame member 16 and a second movable anchor 10 movably attached to the second frame member 16 and slidable along a length of the second frame member 16 by sliding in a channel 18 of the second frame member 16. The first movable anchor 10 connects to a first anchor clip 6 of a seat 4. The second movable anchor 10 connects to a second anchor clip 6 of the seat 4. The first frame member 16 and the second frame member 16 are parallel so that the first movable anchor 10 and the second movable anchor 10 move together to reposition the seat 4 at different locations along the parallel first and second frame members 16. The adjustable vehicle seat attachment system 2 also includes the seat 4. The seat 4 is a child safety seat connected to the anchor frame 14 by the first and second movable anchors 10 and not positioned in an adult vehicle seat of the vehicle 1. The first movable anchor 10 is removable from the channel 18 of the first frame member 16 and the second movable anchor 10 is removable from the channel 18 of the second frame member 16 to remove the seat 4 from the vehicle 1. The first frame member 16 extends along an interior floor of a vehicle 1 and the second frame member extends 16 along the interior floor of the vehicle 1.

Exemplary embodiments of the disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. The systems, methods, and devices disclosed herein may be combined, substituted, modified, or otherwise altered across embodiments as desired. The disclosure is not limited to the systems and devices disclosed herein, but also methods of utilizing the systems and devices.

What is claimed is:

1. An adjustable vehicle seat attachment system for a vehicle, comprising:
   an anchor frame positioned on a floor of the vehicle and between adult seats of the vehicle, the anchor frame including:
   a first track attachable to the vehicle and having a first channel, and
   a second track attachable to the vehicle and having a second channel;
   a first movable anchor movably attached to the first track and configured to slide along the first channel, the first movable anchor having a first rod;
   a second movable anchor movably attached to the second track and configured to slide along the second channel, the second movable anchor having a second rod; and
   a child vehicle seat positioned along the floor in a space between the adult seats and not on an adult seat of the vehicle, the child vehicle seat having one or more anchor clips configured to selectably connect to and disconnect from the first rod and the second rod to removably attach the child vehicle seat to the anchor frame.

2. The adjustable vehicle seat attachment system according to claim 1, wherein the first track of the anchor frame is attachable to the vehicle with body anchors.

3. The adjustable vehicle seat attachment system according to claim 1, wherein the first track of the anchor frame is attachable to the vehicle with body anchors and wherein the second track of the anchor frame is attachable to the vehicle with the body anchors.

4. The adjustable vehicle seat attachment system according to claim 1, wherein the first track is positioned parallel to the second track on an interior surface of the vehicle.

5. A vehicle having an adjustable vehicle seat attachment system comprising:
   a plurality of adult seats;
   an anchor frame comprising a first track and a second track each attached to the vehicle along an interior surface of the vehicle and positioned between at least two adult seats of the plurality of adult seats;
   a first movable anchor movably attached to the first track and having a first rod;
   a second movable anchor movably attached to the second track and having a second rod; and
   a child vehicle seat positioned in a space between the at least two adult seats and not on an adult seat of the plurality of adult seats, the child vehicle seat having a plurality of anchor clips configured to selectably connect to and disconnect from the first rod and the second rod to removably attach the child vehicle seat to the anchor frame,
   wherein the first movable anchor is configured to be movable along a length of the first track and the second movable anchor is configured to be movable along a length of the second track to reposition the child vehicle seat at different locations along the anchor frame.

6. The vehicle according to claim 5, wherein the interior surface of the vehicle is an interior floor surface.

7. The vehicle according to claim 5, wherein the first track and the second track are attached to the vehicle by body anchors extending through the interior surface of the vehicle.

8. The vehicle according to claim 5, wherein the first track includes a channel that is configured to retain a portion of the first movable anchor slidably therein.

9. The vehicle according to claim 5, wherein the first track is positioned parallel to the second track on the interior surface of the vehicle.

10. An adjustable vehicle seat attachment system for a vehicle, comprising:
- an anchor frame positioned between adult seats of the vehicle, the anchor frame including:
  - a first track having a channel and attached to the vehicle by body anchors, and
  - a second track having a channel and attached to the vehicle by the body anchors;
- a first movable anchor movably attached to the first track and slidable along a length of the first track by sliding in the channel of the first track, the first movable anchor having a first rod;
- a second movable anchor movably attached to the second track and slidable along a length of the second track by sliding in the channel of the second track, the second movable anchor having a second rod; and
- a child vehicle seat positioned in a space between the adult seats and not on an adult seat of the vehicle, the child vehicle seat having one or more anchor clips configured to selectably connect to and disconnect from the first rod and the second rod to removably attach the child vehicle seat to the anchor frame,
- wherein the first track and the second track are parallel so that the first movable anchor and the second movable anchor move together to reposition the child vehicle seat at different locations along the parallel first and second tracks.

11. The adjustable vehicle seat attachment system according to claim 10, wherein the first track extends along an interior floor of the vehicle and wherein the second track extends along the interior floor of the vehicle.

* * * * *